US009010959B2

(12) United States Patent
Edelson et al.

(10) Patent No.: US 9,010,959 B2
(45) Date of Patent: Apr. 21, 2015

(54) SYSTEM AND METHOD FOR GENERATING ARTIFICIAL LIGHT

(75) Inventors: Jonathan Sidney Edelson, Portland, OR (US); Rodney T. Cox, North Plains, OR (US); Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 108 days.

(21) Appl. No.: 13/569,314

(22) Filed: Aug. 8, 2012

(65) Prior Publication Data
US 2013/0088860 A1 Apr. 11, 2013

Related U.S. Application Data

(60) Provisional application No. 61/521,193, filed on Aug. 8, 2011.

(51) Int. Cl.
| *F21L 4/02* | (2006.01) |
| *F21L 4/00* | (2006.01) |
| *F21S 9/03* | (2006.01) |
| *F21Y 101/02* | (2006.01) |

(52) U.S. Cl.
CPC ... *F21L 4/02* (2013.01); *F21L 4/00* (2013.01); *F21Y 2101/02* (2013.01); *F21S 9/032* (2013.01)

(58) Field of Classification Search
USPC .......... 362/183, 184, 157; 315/209 R, 185 R
See application file for complete search history.

(56) References Cited

U.S. PATENT DOCUMENTS

| 4,246,477 | A | | 1/1981 | Latter |
| 4,297,000 | A | | 10/1981 | Fries |
| 4,903,172 | A | * | 2/1990 | Schoniger et al. ............. 362/612 |
| 5,013,972 | A | * | 5/1991 | Malkieli et al. ............ 315/209 R |
| 6,163,038 | A | | 12/2000 | Chen et al. |
| 6,420,906 | B1 | * | 7/2002 | Kohda .......................... 326/114 |
| 7,057,821 | B2 | | 6/2006 | Zincone |
| 7,766,504 | B1 | | 8/2010 | Holin |
| 2002/0039034 | A1 | * | 4/2002 | Kohda .......................... 326/123 |
| 2006/0220895 | A1 | | 10/2006 | Arcaria et al. |
| 2008/0123328 | A1 | | 5/2008 | Lai et al. |
| 2009/0085497 | A1 | | 4/2009 | Osborn |
| 2010/0126549 | A1 | | 5/2010 | Ryu |
| 2010/0201279 | A1 | * | 8/2010 | Zhao .......................... 315/185 R |
| 2011/0107689 | A1 | | 5/2011 | Holguin et al. |

* cited by examiner

Primary Examiner — Bao Q Truong

(57) ABSTRACT

A system and method for generating artificial light for interior or exterior illumination are provided to illuminate interior and exterior underground, underwater, ground level, and above ground structures and spaces by employing various combinations of solar photovoltaic-generated power and conventional power to directly power LED or other light sources to provide interior or exterior illumination of a desired optimal intensity. One embodiment of this system provides a virtual skylight that illuminates interior structures and spaces with the benefits of illumination provided by a conventional skylight but without the disadvantages. A direct connection between a solar photovoltaic cell and the LED or other light-producing source eliminates complex and costly circuitry in both interior and exterior applications. The system is configured to provide, alternatively, solar PV power and/or conventional power as required to maintain artificial illumination at a desired optimum threshold intensify.

20 Claims, 3 Drawing Sheets

SYSTEM AND METHOD FOR GENERATING ARTIFICIAL LIGHT

PRIORITY CLAIM

This application claims priority from U.S. Provisional Application No. 61/521,193, filed Aug. 8, 2011, the disclosure of which is incorporated herein.

TECHNICAL FIELD

The present invention relates generally to systems and methods for producing interior and exterior illumination in a wide range of different kinds of structures and spaces occupied, used, and inhabited by humans and specifically to a system and method for generating artificial light for such structures and spaces using solar photovoltaic cells and a more conventional power source.

BACKGROUND OF THE INVENTION

Humans occupy, use, and inhabit many different kinds of structures and spaces on the ground, above the ground, under the ground, and even underwater. These structures and spaces are frequently in constant use around the clock, and adequate lighting to support their occupation, use, and habitation by humans is necessary. Most ground level and above the ground structures and spaces can receive at least some of the illumination required from sunlight. Underground and underwater spaces and structures generally cannot receive solar illumination and must rely on artificial light to support human occupation, use, or habitation. Without adequate light, humans would not be able to work, use, or live in such structures and spaces as subways, mines, underground storage and like facilities, underwater areas in offshore drilling rigs, tunnels, factories, warehouses, hospitals, libraries, schools, theaters, apartment buildings, hotels, stores, shopping malls, office buildings, military installations, restaurants, houses, airports, bridges, roads, highways or anywhere that requires lighting beyond natural light. The range of structures and spaces used, occupied, or inhabited by humans is very extensive.

Providing adequate interior or exterior illumination for structures and spaces such as those described above can present challenges. Underground and underwater structures and spaces like mines, subway and other tunnels, and drilling rigs, for example, never receive natural light, and all illumination must be artificial. Enclosed commercial and industrial structures like factories, warehouses, hospitals, shopping malls, and airports, for example, have few or no windows to let natural light into the interior and rely virtually entirely on artificial lighting. Very few of the structures described above have windows or skylights that let in sufficient natural light to illuminate their interiors, and light must be supplied by artificial sources.

Interior lighting must often be capable of illuminating structures or spaces around the clock to accommodate their continuous use without interruption when these structures or spaces must be used or occupied 24 hours a day. Interior and exterior illumination frequently must be maintained beyond usual working hours for security reasons. Many facilities, such as retail stores, schools, and libraries, for example, are lighted during the day as well as beyond business hours. In addition, the intensity of the artificial light supplied must be sufficient to enable those working in an interior space to perform their jobs.

In some exterior spaces, such as, for example, along airport runways, at street intersections, along subway and railroad tracks, and at railroad crossings, specific lighting is required to be on continuously at all times without interruption for safety reasons. In other above ground exterior spaces, such as adjacent to the exteriors of buildings, lighting is required only at night. The intensity of exterior lighting, whether it is required during the day, at night, or around the clock, must be sufficient to achieve its purpose. For example, the lighting provided along an airport runway, taxiway, or other ground area must clearly highlight the boundaries of these areas at all times to enable the aircraft to locate them accurately during landing, take off, and taxi.

The cost of the electric power required to power interior and/or exterior illumination, particularly for large structures and spaces, depends on current energy costs and can be a sizeable part of a business or municipality's operating budget. The use of compact fluorescent and standard fluorescent light sources may reduce costs, but a significant amount of heat can be generated by these and other interior lighting sources, which leads to increased costs for cooling the interior of a facility during hot weather. Sodium vapor lighting used for exterior lighting, such as street and highway lighting, presents similar challenges.

Skylights have been installed in many enclosed structures to let natural light info the interiors. While skylights may effectively increase the amount of natural light that enters a building, they can act as undesirable heat sinks, are costly to install and can present continuing maintenance problems. The installation of a skylight requires an opening to be cut in a building roof. The joint between the skylight and the roof is susceptible to leaking, and must be carefully sealed upon installation and maintained to insure that it is water-tight to avoid water damage inside the building. If the joint is not properly sealed, exterior air may also flow into the building, creating drafts and interfering with heating and cooling. The cost of repairs to skylights can exceed the costs of roof repairs. Additionally, skylights must be washed on a regular basis to maximize their effectiveness in admitting natural light into a building.

To reduce power costs, solar cells have been adapted to provide power for interior lighting in built structures and in underground spaces, such as mines, for example. Solar cells have also been used to provide power for exterior lighting in many structures and spaces. Street lights and outdoor security lighting, for example, are available with solar cells. If the foregoing examples employ currently available solar cells, complex circuitry and controllers are required, and the cost of the electronics can significantly exceed the cost of the solar cell. As a result, the desired cost savings for these types of solar cells have not been achieved.

The use of solar cells to power light sources of different types is known in the art. U.S. Pat. No. 7,766,504 to Holin, U.S. Patent Application Publication 2010/0126549 to Ryu, U.S. Patent Application Publication 2008/0123328 to Lai et al, and U.S. Patent Application Publication 2006/0220895 to Arcaria et al, for example, ail describe solar-powered illumination devices including a solar cell that is exposed to sunlight, a battery or like structure that stores the power produced, and an LED light source that emits light when sunlight is not available. The devices described in this patent and these publications include complex electronics. They are intended to be used only as outdoor illuminating devices. It is nowhere suggested that these solar-powered structures could be modified to provide a primary source of artificial interior illumination for the interior of an enclosed structure or that they could provide a reliable source of inexpensive illumination for exterior or underground uses.

The use of solar cells and light-emitting diode (LED) lighting sources to illuminate interior areas has been described in the art. In U.S. Pat. No. 7,057,821, for example, Zincone discloses an integrated natural and artificial lighting system to provide light to the interior of a building. In this system, natural light is converted to electricity by a photovoltaic (PV) cell and stored in a battery until it is used to power LED or fluorescent lights, which provide artificial light when natural light is not available. A connection to an external power source is available for backup when needed. The system described by Zincone is specifically adapted to be placed within a light shaft or skylight in the roof of a building, and there is no suggestion whether this system would be functional other than as part of the light shaft or skylight assembly disclosed to be integral components of the system. Consequently, all of the challenges associated with skylights accompany the Zincone lighting system. The Zincone system, moreover, includes complex circuitry and a heat exchanger to deal with the heat generated in the skylight. The use of this system to provide exterior illumination is not suggested.

The provision of solar lighting to enclosed quarters, such as tunnels, mines, factories, theaters, stores, restaurants, office, and homes, where a substantial amount of electrical energy is used during daylight hours to maintain lighted interiors is disclosed in U.S. Pat. No. 4,279,000 to Fries and suggests augmenting the system described with regular lighting. However, the Fries system employs a rather complex arrangement of a solar collector and fiber optic cables to collect and transmit solar light to light distribution devices. Latter, in U.S. Pat. No. 4,246,477, describes an artificial and solar lighting system for a building that directs a solar beam through a light transmission channel to a location within the building where light is distributed to light fixtures. The light fixtures also have fluorescent tubes that automatically generate backup artificial light. The light distribution channel described by Latter requires an opening to be cut in the building roof so that this system, has all of the disadvantages associated with providing natural light through a skylight. Neither of the foregoing systems provides an illuminator useful for exterior lighting.

Other lighting systems have been disclosed that employ a combination of solar cells and LED lighting to illuminate building interiors. U.S. Patent Application Publications 2011/0107689 to Holguin et al and 2009/0085497 to Osborn describe such interior lighting systems. The systems described in both of these publications, however, also are specifically adapted for use in skylights or light tubes installed in a building roof. Additionally, both systems have control systems of the type that are relatively complex and potentially costly. Holguin et al does suggest that a standard voltage supplemental lighting system powered by on-grid power could be included in the control system. Neither Holguin et al nor Osborn, however, even remotely suggests that their systems could be adapted for installation or use other than with a skylight or light tube or that their use to illuminate exterior structures or spaces is possible.

The prior art, therefore, fails to suggest a system or method for generating artificial light to illuminate interior and exterior structures and spaces without using skylights or similar light-directing structures that employs various combinations of solar photovoltaic-generated power and conventional power without complex circuitry to directly power LED or other light sources to provide required interior or exterior illumination.

SUMMARY OF THE INVENTION

It is a primary object of the present invention, therefore, to overcome the deficiencies of the prior art and to provide a system and method for generating artificial light to illuminate interior and exterior structures and spaces that employs various combinations of solar photovoltaic-generated power and conventional power without complex circuitry to directly power LED or other light sources to provide required interior or exterior illumination.

It is another object of the preset invention to provide a system for generating artificial light for interior or exterior illumination that is powered alternatively by solar photovoltaic power or by conventional power determined by a threshold intensity of the light produced by power from the solar photovoltaic cell.

It is an additional object of the present invention to provide a system for generating artificial light for interior or exterior illumination that is powered simultaneously by solar photovoltaic power and conventional power sources.

It is a further object of the present invention to provide a system for generating artificial light for interior or exterior illumination that equally effective powers LED, incandescent, fluorescent, and other light-producing devices.

It is yet another object of the present invention to provide a system for generating artificial light for interior or exterior illumination designed to operate a selected light source at a desired optimal intensity.

It is yet an additional object of the present invention to provide a system for generating artificial light for interior or exterior illumination that substantially eliminates complex circuitry between a source of solar power and a light-producing device.

It is yet a further object of the present invention to provide a system for generating artificial light for interior or exterior illumination that eliminates DC-AC-DC conversion steps, voltage regulators, and substantially all of the wiring required by prior systems.

It is a still further object of the present invention to provide a virtual skylight that generates and provides artificial light for interior illumination without the disadvantages of a real skylight.

In accordance with the aforesaid objects, a system and method for generating artificial light for interior and exterior illumination are provided. The present system for generating artificial light illuminates the interior of a building without using conventional skylights by employing various combinations of solar photovoltaic-generated power and conventional power with simple connections and circuitry to directly power LED or other light sources to provide interior illumination of a desired optimum intensity. This system is essentially a virtual skylight intended for both above ground and underground installations that provides the benefits of the illumination provided by a conventional skylight without the disadvantages described above. A direct connection between a solar photovoltaic cell and the LED or other light-producing source eliminates complex and costly circuitry in both interior and exterior applications. The system is configured to provide, alternatively, solar PV power and/or conventional power as required to maintain the illumination of the artificial light generated in both interior and exterior structures and spaces at a desired, optimum threshold intensity. Additional configurations and arrangements of the light-generating system are provided.

DESCRIPTION OF THE INVENTION

Figure 1A:
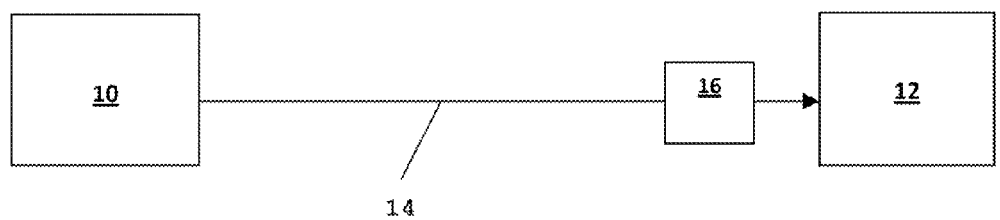
FIG. 1a is a schematic diagram of one arrangement of a lighting system with a solar photovoltaic cell powered LED according to the present invention.

The present invention is ideally suited for providing interior and exterior illumination in and to a very wide range of structures and spaces occupied, used, or inhabited by humans located under ground, under water, at ground level, and above the ground or water that must be lighted by artificial illumination for most or even all of the day and night. These applications include, but are not limited to, such structures and spaces as subways, mines, underground storage and like facilities, underwater areas in offshore drilling rigs, tunnels, factories, warehouses, hospitals, libraries, schools, theaters, apartment buildings, hotels, stores, shopping malls, office buildings, military installations, restaurants, housing of all kinds, including single family and multifamily houses, airports, bridges, roads, highways, or anywhere that requires lighting beyond natural light during the day or at night. The foregoing description is not intended to be an exhaustive list or limiting in any way. Any structure or space that requires artificial light is intended to be encompassed by the scope of the present invention.

The present system provides, in one embodiment, a virtual skylight that is able to use power from solar photovoltaic (PV) cells, either directly or in combination with conventional power, to power lighting sources that produce the required interior or exterior illumination. A solar PV cell generates electricity in direct proportion to the intensity of the light to which if is exposed. When a solar PV cell is outdoors, the electricity generated is based on the amount of sunlight that fails on it. The electric current produced by an outdoor solar PV cell, therefore, is directly proportional to and representative of ambient outdoor light. Artificial light can be produced by utilizing solar photovoltaic cell-generated electricity to directly power a light source, such as an incandescent light, a fluorescent light, an LED, or other light-producing device. Artificial light can also be produced by connecting light-producing devices to a conventional power source. The system and method of the present invention employs a combination of both forms of generating artificial light to provide a reliable, cost-effective source of interior and exterior illumination to any structure or space that requires lighting.

Referring to the drawings, Figures la and lb are schematic diagrams of two variations of a first light-generating arrangement according to the present invention. In Figure la, a solar PV cell 10 is directly connected to a light-producing device 12. The light-producing devices described herein are referred to as LEDs (light-emitting diodes) and are preferably LEDs. The LEDs may be replaced by any suitable light-producing device, including, but not limited to incandescent lights, fluorescent lights, compact fluorescent lights, sodium vapor lights, and the like. Any light-producing sources and devices capable of providing light in the structures and spaces described herein are contemplated to fall within the scope of the present invention. LEDs offer many advantages compared to incandescent lights and even to fluorescent lights. LEDs require less energy, demonstrate greater durability and reliability, improved robustness, faster switching, a smaller size, and a longer life than incandescent light sources. Various types of LEDs are available. A white LED, such as, for example, that disclosed in U.S. Pat. No. 6,163,038 to Chen et al, rather than a colored LED is preferred for use in the present system and method. The lighting system of the present invention is contemplated for use with at least one LED or other light-producing device, although large numbers of such devices will be required to provide illumination of optimum intensity in large structures and spaces. The specific arrangement and numbers of LEDs will depend primarily on the interior and/or exterior structure or space to be lighted and could well include hundreds or thousands of LEDs or other light-producing devices to provide illumination of a desired optimal intensity.

A solar PV cell, which forms part of a virtual skylight in one embodiment of the present invention, may have any one of a number of configurations. Since, in an interior application, a solar PV cell will be located on the exterior of a building or other structure, a roof-mounted panel is a preferred configuration and location. A roof-mounted solar panel can provide insulation on the roof, which helps to reduce interior heating and air conditioning costs. The roof location of the solar PV cell in an interior lighting application also facilitates the connections between the solar PV cell and the LED light source that provides interior light, particularly when the LED light source is located adjacent to a roof, ceiling, or other uppermost interior structure as a part of a virtual skylight. These connections are preferably wires, like the wire 14 shown connecting solar PV cell 10 and LED light source 12 in FIG. 1a. The exteriorly located solar PV cell 10 is thus connected directly to the interiorly mounted LED light source 12. If desired, a switch 16 may be connected between the solar PV cell TO and the LED light source 12 to allow an operator to commence or halt light production in a virtual skylight or other light-producing area.

Any structure or space above or below the ground or below the water can be connected to any kind of appropriate solar PV cell or equivalent structure. The specific location of the solar PV cell will depend on the specific underground, underwater, ground level, or above ground or water structure or space to be lighted, whether it is an interior or an exterior space.

Figure 1B:
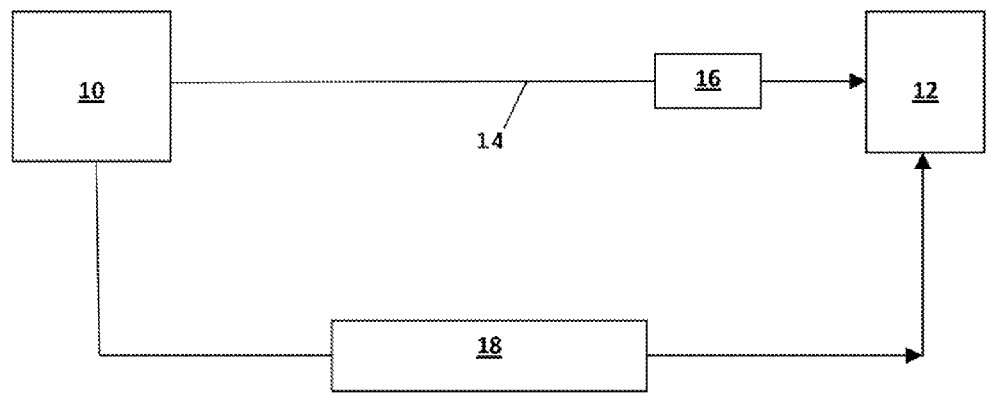
FIG. 1b is a schematic diagram of the lighting system of FIG. 1a with the optional addition of a driver or control circuit.

FIG. 1b is a schematic diagram of the lighting system of FIG. 1a with the addition of an optional control or driver circuit 18. The electricity produced by the solar PV cell may optionally be routed through the control or driver circuit. The electrical output of the solar PV cell 10 is provided directly to the LED light source 12 in the arrangements shown in both FIGS. 1a and 1b, or may be optionally routed through the driver circuit 18 to provide further control over the lighting system. The LED light source 12 generates light at an intensity determined by the amount of power provided by the solar PV cell 10.

Figure 2:
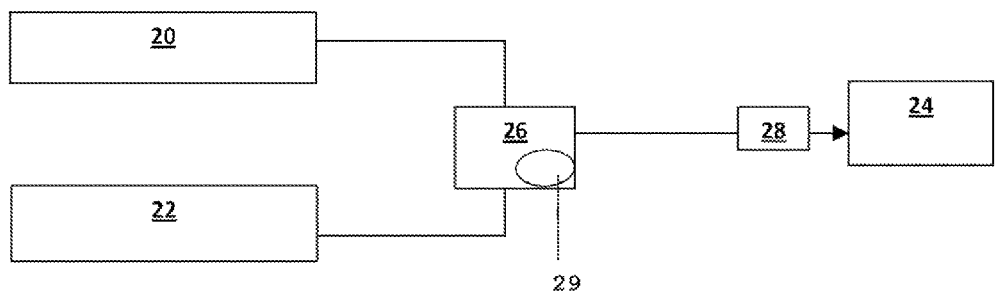
FIG. 2 is a schematic diagram of a second arrangement of a lighting system according to the present invention that uses alternate sources of power from a solar photovoltaic cell and a conventional power source.

FIG. 2 shows a second arrangement for a lighting system according to the preset invention. In this arrangement, power for the LED or other light-producing source or device is provided alternatively by a solar PV cell 20 or a conventional power source 22. A conventional power source 22 could include a mains power source, which is the general alternating current (AC) electrical supply used to provide power to the structure or space in which the system of the present invention is located. Other conventional power sources, such as, for example but not limited to, generator power sources and any other power sources used to provide a regular supply of electric power to a structure or space to meet that structure or space's power need, are also intended to be included within the scope of the present invention. The use of the term "conventional power" is understood to include all of these power sources. The conventional power and solar PV outputs are connected to an LED light source 24 through a driver circuit 26. A user-operable switch 28 may be provided as described above to allow an operator to commence or halt light production. When adequate electricity is generated by the solar PV cell 20, the LED light source 24 is powered exclusively by the solar PV cell. However, when, the electricity from the solar PV cell 20 is not adequate, the LED light source 24 is powered exclusively by the conventional power source 22. This design enables the LED light source 24 to produce light at all times when the solar PV cell 20 can generate adequate electricity from outdoor ambient light to produce artificial light of the required intensity. The LED light source 24 can also produce light during other times, such as at night or on cloudy days, when outdoor ambient lighting is absent or insufficient for solar power generation capable of producing adequate artificial lighting of the required intensity. In that event, power for the LED light source 24 is produced by the conventional power supply 22 or any other available power sources.

The driver circuit 26 includes a diode-OR circuit 29 that enables the drive circuit to draw power from whichever power source, the solar PV cell 20 or the conventional power supply 22, is actually providing power to produce light of a desired optimal intensity at a given time. The diode-OR circuit 29 is preferably designed so that the requisite amount of input power to drive the LED light source 24 or other light-producing source at a desired intensity is regarded by the diode-OR circuit 29 as the threshold level that prompts the diode's selection of one power source input as compared to another. Although a single diode-OR circuit is preferred to select the power source according to the established threshold or other suitable selection criterion, other devices could also be used to allow the solar PV cell 20 to directly drive the LED light source 24 whenever the sun is shining, but allow the conventional power source 22 to drive the LED light source 24 whenever needed to produce light of a desired optimal intensity in or outside a space or structure. The same LED light sources are used for both conventional powered lighting and virtual skylight lighting.

Figure 3:
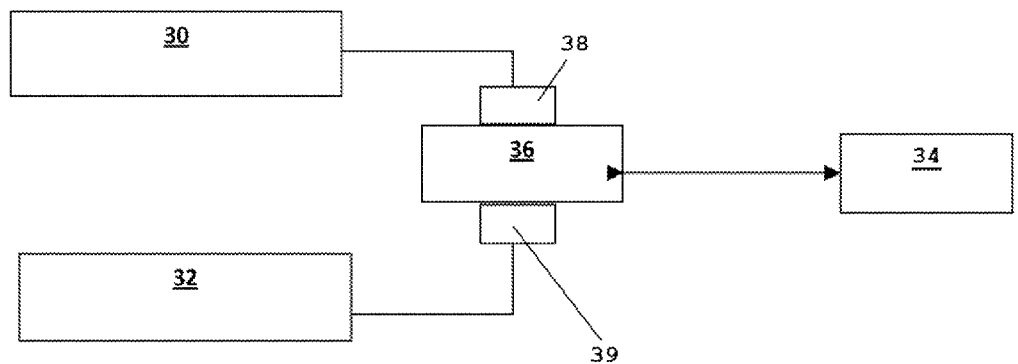
FIG. 3 is a schematic diagram of a third arrangement of a lighting system according to the present invention using alternative solar photovoltaic cell and conventional power sources.

FIG. 3 presents a schematic diagram of a third possible arrangement of the lighting system of the present invention. In this arrangement, a solar PV cell 30 and a conventional power supply 32 are connected to an LED light source 34 through a driver circuit 36, as described in connection with FIG. 2. Selected diodes or other electric circuits 38, 39 are used to balance the draw of power from the mains power source 32 and the solar PV cell 30, individually or simultaneously, as required to direct sufficient power to LED light source 34. The driver circuit 36 may augment power from the solar PV cell 30 with power from the conventional power supply 32 or may additionally supplant solar PV cell power with conventional power to produce light with a desired optimal intensity.

Figure 4:
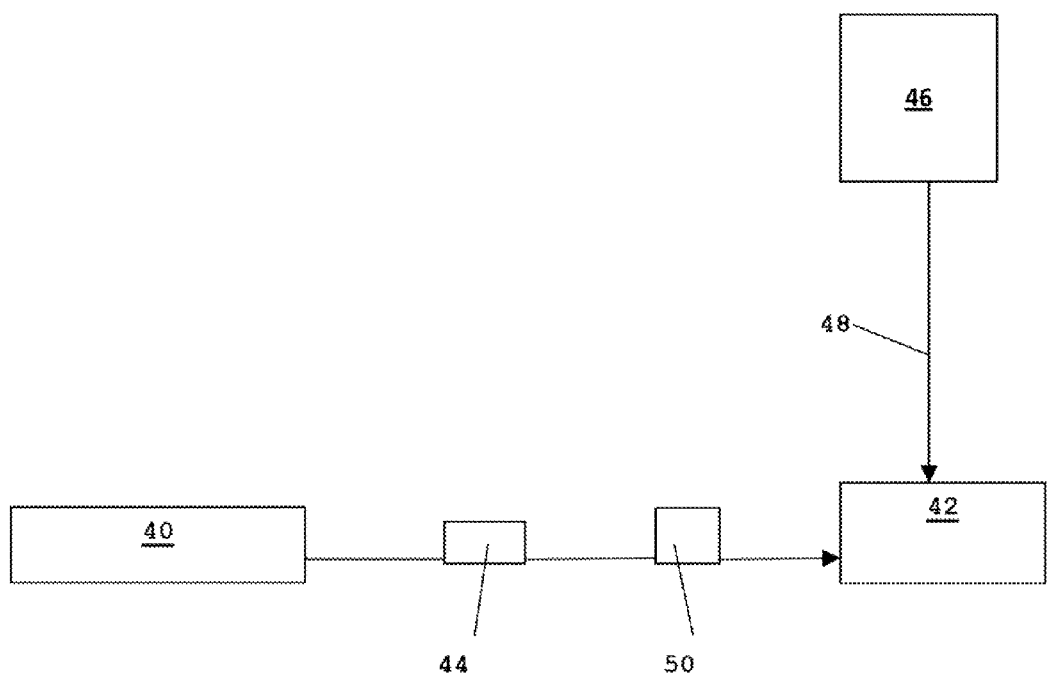
FIG. 4 is a schematic diagram of a fourth configuration of a lighting system according to the present invention using alternative solar photovoltaic cell and conventional power sources.

FIG. 4 is a schematic diagram of a fourth configuration of a lighting system according to the present invention. In this configuration, a conventional power supply 40 is connected to an LED light source 42 through a driver circuit 44. A solar PV cell 46 is directly connected to the LED light source 42 through a wire 48, as in Figure 1a above. A catch diode 50 or other suitable electric circuit enables the LED light source 42 to be powered directly by the solar PV cell 46 while also drawing power from the mains power source 40 through the driver circuit 44. Catch diodes are typically used to eliminate a sudden voltage spike seen across an inductive load when the voltage supply is suddenly reduced or removed, which ensures a smooth power supply in the configuration shown in FIG. 4. Alternatively, the LED light source 42 can be powered entirely by the conventional power source 40 through the driver circuit 44.

The various arrangements and configurations of the virtual skylight and interior or exterior illumination system of the present invention described above clearly demonstrate that the there is no direct current (DC) to AC to DC conversion step, which reduces the cost and enhances the efficiency of the present lighting system. There are, moreover, no voltage regulator steps required. Since there is no circuitry or, at most, only simple circuitry and only a direct low voltage connection between solar FV cells and LED light sources, the bulk of the wiring that would normally be required is eliminated.

The present invention additionally provides a method for generating artificial light to illuminate interior or exterior spaces of the types and in the locations described above by utilizing solar photovoltaic-generated electricity, either alone or in combination with electricity from conventional power or another power source, to directly power LED light sources or other light-producing devices. In accordance with one aspect of the present method, a solar PV cell is located exteriorly of an interior space to be lighted to generate electricity from ambient outdoor lighting. In exterior applications, the solar PV cell will usually be located in the same general exterior space where the lighting is required, although a more remote location may be possible, depending on the specific application. Electricity generated by the solar PV cell is caused to flow directly along a wire connecting the exterior solar PV cell to an interior or exterior LED or other light-producing device, thereby causing light to be produced inside an interior structure or space or in an exterior space. A system operator can activate a switch to start or stop light production as desired. In accordance with another aspect of the method, a conventional power supply is provided in addition to a solar PV cell, and the two power sources are connected to an LED light source or supply in an arrangement that permits the selective activation of either power source in response to the availability of sunlight to maintain indoor or outdoor illumination at a desired threshold intensity for the specific interior or exterior requirements. An optimal threshold intensity for light produced by a light-producing device to illuminate a specific interior or exterior structure or space may be determined. When the intensity of the light produced by the light-producing device exceeds the threshold intensity, a diode-OR circuit may direct power only from the solar PV cell or solar power source to power the light-producing device. When the intensity of light produced by the light-producing device is below the threshold intensity, the diode-OR circuit directs power only from the conventional power source to the light-producing device.

The system and method for generating artificial light of the present invention could also be used to provide illumination in the exteriors and interiors of a wide range of vehicles, including, but not limited to, automobiles, trucks, subway and train cars, aircraft, ships, and the like. Daytime and nighttime illumination of these vehicles makes them more visible to people and other vehicles and helps to maximize their safe operation.

The system and method for generating artificial light described herein has been described with respect to preferred embodiments. This is not intended to be limiting and other, equivalent, structures and arrangements that perform the required functions are also contemplated to be within the scope of the present invention.

INDUSTRIAL APPLICABILITY

The system and method for generating artificial light described herein will find their primary applicability in producing interior and exterior illumination in a wide range of underground, underwater, ground level, and above ground structures and spaces when the production of a reliable, cost-effective source of artificial light is desired.

The invention claimed is:

1. A system for generating artificial light of a desired optimal intensity to illuminate any desired interior or exterior structure or space, comprising
   a. solar energy capture means for capturing outdoor ambient sunlight and producing an electric output;
   b. connector wire means comprising a wire connected to said electric output for directing said electric output to light-producing means;
   c. light-producing means capable of receiving said electric output and producing therefrom artificial light of a desired optimal intensity to illuminate a selected interior or exterior space;
   d. switch means operable to commence production of light by said light-producing means or to halt production of light by said light-producing means;
   e. driver circuit control means interposed between said solar energy capture means and said light-producing means for controlling the operation of said light-generating system; and
   f. power supply means connected to said light-producing means through said driver circuit control means to provide an alternate source of power for producing artificial light of said desired optimal intensity, wherein said driver circuit control means includes diode-OR circuit means for selectively directing either said solar energy capture means or said power supply means to power said light-producing means to produce artificial light, depending on a threshold minimum intensity of light produced by said light-producing means.

2. The light generating system described in claim 1, wherein said solar energy capture means comprises a solar photovoltaic cell, and said light-producing means comprises at least one light-emitting diode.

3. A system for generating artificial light of a desired optimal intensity to illuminate any desired interior or exterior structure or space, comprising
   a. solar energy capture means for capturing outdoor ambient sunlight and producing an electric output;
   b. connector wire means comprising a wire connected to said electric output for directing said electric output to light-producing means;
   c. light-producing means capable of receiving said electric output and producing therefrom artificial light of a desired optimal intensity to illuminate a selected interior or exterior space;
   d. switch means operable to commence production of light by said light-producing means or to halt production of light by said light-producing means;
   e. driver circuit control means interposed between said solar energy capture means and said light-producing means for controlling the operation of said light-generating system; and
   f. power supply means connected to said light-producing means through said driver circuit control means to provide an alternate source of power for producing artificial light of said desired optimal intensity, further comprising at least one of diode means or electric circuit means for balancing power drawn by said driver circuit control means from said solar energy capture means and said power supply means and providing said balanced power to said light-producing means.

4. The light generating system described in claim 3, wherein at least one of a catch diode means or said electric circuit means is connected to said power supply means and to said solar energy capture means to direct power to said light-producing means simultaneously from both said solar energy capture means and said power supply means or entirely by said power supply means.

5. The light generating system described in claim 4, wherein said solar energy capture means comprises a solar photovoltaic cell, and said light-producing means comprises at least one light-emitting diode.

6. The light generating system described in claim 1, wherein said power supply means is a mains power supply or power supplied by a generator.

7. The light generating system described in claim 4, wherein said power supply means is a mains power supply or power supplied by a generator.

8. A system for generating artificial light of a desired optimum intensity to illuminate an interior or exterior structure or space, comprising
   a. at least one solar photovoltaic cell directly connected to at least one light-producing device;
   b. an additional power supply electrically connected to said at least one light-producing device;
   c. a driver circuit including an OR diode connected separately to each of said solar photovoltaic cell and said additional power supply to receive electric outputs therefrom and to direct said electric outputs from one or the other of said solar photovoltaic cell or said additional power supply to said light-producing device depending on the power output of said solar photovoltaic cell and the intensity of the light produced by said light-producing device; and
   d. a switch operable to commence or halt the production of light by said light-producing device.

9. The system for generating artificial light described in claim 8, wherein said additional power supply comprises a conventional power supply comprising a mains power supply or power supplied by a generator.

10. The system for generating artificial light described in claim 8, wherein said system generates artificial light in an interior structure or space selected from the group including factories, warehouses, hospitals, libraries, schools, theaters, apartment buildings, hotels, stores, shopping malls, office buildings, military installations, restaurants, single family and multifamily houses, and airports.

11. The system for generating artificial light described in claim 8, wherein said system generates artificial light in an exterior structure or space selected from the group including offshore drilling rigs, tunnels, mines, airport runways, bridges, roads, highways, subway lines, and railroad lines.

12. The system for generating artificial light described in claim 8, wherein said system generates artificial light inside and outside vehicles selected from the group including automobiles, trucks, subway and train cars, aircraft, and ships.

13. A method for generating artificial light of a desired optimum intensity from a solar power source and, alternatively, a conventional power source for the interior or exterior illumination of an interior structure or space or an exterior structure or space, comprising the steps of:

a. providing power source means comprising a solar power source and a conventional power source;

b. providing light-producing device means capable of generating light of an optimum intensity to illuminate an interior or exterior structure or space;

c. providing solar photovoltaic cell means connected to said light-producing device means through driver circuit means;

d. connecting said power source means to said light-producing device means through said driver circuit means, wherein said driver circuit means is provided with diode-OR circuit means that directs power from said solar power source or power from said conventional power source to said light-producing device means; and e. determining an optimal threshold intensity for light produced by said light-producing device means to illuminate said interior or exterior structure or space; wherein when the intensity of the light produced by the light-producing device means exceeds the threshold intensity, said diode-OR circuit means directs power only from said solar power source to power said light-producing device means, and when the intensity of light produced by the light-producing device means is below the threshold intensity, said diode-OR circuit means directs power only from said conventional power source to said light-producing device.

14. The method of claim 13, wherein an optimum intensity of artificial light to illuminate an interior structure or space is generated by directly connecting at least an exteriorly located solar photovoltaic cell means to an interiorly located light-producing device means to produce a virtual skylight illuminating said interior structure or space.

15. A method for generating artificial light in a selected interior space or an exterior space using the system of claim 8 by connecting an exterior solar photovoltaic cell and said additional power supply to said at least one light-producing device so that when the solar photovoltaic cell is not able to produce light of a desired optimum intensity for illumination of the selected interior space or exterior space, the additional power supply is activated to power the light-producing device to produce light of the desired intensity to illuminate the selected interior or exterior space.

16. The method for generating artificial light in a selected interior space or an exterior space of claim 15, wherein said solar photovoltaic cell and said additional power supply are activated individually or together to supply power as required to cause said at least one light-producing device to generate light of the desired intensity to illuminate the selected interior space or the exterior space.

17. The method for generating artificial light in a selected interior space or an exterior space of claim 15, wherein an operator controls the production of artificial light by activating said switch.

18. The method for generating artificial light described in claim 13, wherein said method generates artificial light in an interior structure or space selected from the group including factories, warehouses, hospitals, libraries, schools, theaters, apartment buildings, hotels, stores, shopping malls, office buildings, military installations, restaurants, single family and multifamily houses, and airports.

19. The method for generating artificial light described in claim 13, wherein said method generates artificial light in an exterior structure or space selected from the group including offshore drilling rigs, tunnels, mines, airport runways, bridges, roads, highways, subway lines, and railroad lines.

20. The method for generating artificial light described in claim 13, wherein said method generates artificial light inside and outside vehicles selected from the group including automobiles, trucks, subway and train cars, aircraft, and ships.

* * * * *